US011978421B2

(12) United States Patent
Fang et al.

(10) Patent No.: US 11,978,421 B2
(45) Date of Patent: May 7, 2024

(54) DRIVING CIRCUIT, DRIVING METHOD AND DISPLAY DEVICE

(71) Applicant: Chipone Technology (Beijing) Co., Ltd., Beijing (CN)

(72) Inventors: Ziming Fang, Beijing (CN); Tianhao Chen, Beijing (CN)

(73) Assignee: CHIPONE TECHNOLOGY (BEIJING) CO., LTD.

( * ) Notice: Subject to any disclaimer, the term of this patent is extended or adjusted under 35 U.S.C. 154(b) by 0 days.

(21) Appl. No.: 18/017,401

(22) PCT Filed: May 18, 2021

(86) PCT No.: PCT/CN2021/094427
§ 371 (c)(1),
(2) Date: Jan. 21, 2023

(87) PCT Pub. No.: WO2022/016970
PCT Pub. Date: Jan. 27, 2022

(65) Prior Publication Data

US 2023/0260474 A1 Aug. 17, 2023

(30) Foreign Application Priority Data

Jul. 21, 2020 (CN) ........................ 202010705189.X

(51) Int. Cl.
*G09G 3/36* (2006.01)
*G09G 3/20* (2006.01)

(52) U.S. Cl.
CPC ......... *G09G 3/3685* (2013.01); *G09G 3/2096* (2013.01); *G09G 3/3696* (2013.01);
(Continued)

(58) Field of Classification Search
CPC .. G09G 3/3685; G09G 3/2096; G09G 3/3696; G09G 2310/0286; G09G 2310/0291
See application file for complete search history.

(56) References Cited

U.S. PATENT DOCUMENTS

2005/0264546 A1 12/2005 Chou et al.
2017/0213519 A1 7/2017 Shu et al.
(Continued)

FOREIGN PATENT DOCUMENTS

CN 1627143 A 6/2005
CN 1870121 A 11/2006
(Continued)

*Primary Examiner* — Robert J Michaud
(74) *Attorney, Agent, or Firm* — Treasure IP Group, LLC

(57) ABSTRACT

Disclosed is a driving circuit for driving a display panel, comprising: a timing controller for providing a start pulse signal and a selection signal; a driving module comprising a plurality of cascaded driver units and configured to control a part of the driver units to receive the start pulse signal according to the selection signal and generate a grayscale voltage according to the start pulse signal and the data signal. In the driving circuit according to the present disclosure, the driving module selects a part of the driver units to receive the start pulse signal according to the selection signal, so that the resolution of the display panel can be arbitrarily changed without exceeding an intrinsic physical resolution, thus reducing research and development cost and cumbersome processes for customization, and speeding up shipment.

12 Claims, 3 Drawing Sheets

200

(52) U.S. Cl.
CPC ............... *G09G 2310/0286* (2013.01); *G09G 2310/0291* (2013.01)

(56) References Cited

U.S. PATENT DOCUMENTS

| | | | | |
|---|---|---|---|---|
| 2018/0061299 | A1* | 3/2018 | Jung | G09G 3/3688 |
| 2022/0011895 | A1* | 1/2022 | Park | G06F 3/0412 |

FOREIGN PATENT DOCUMENTS

| | | | |
|---|---|---|---|
| CN | 101119105 | A | 2/2008 |
| CN | 102456321 | A | 5/2012 |
| CN | 103680442 | A | 3/2014 |
| CN | 107222197 | A | 9/2017 |
| CN | 108932935 | A | 12/2018 |
| CN | 109643515 | A | 4/2019 |
| CN | 110379389 | A | 10/2019 |
| CN | 110379389 | A | 10/2019 |
| CN | 111833825 | A | 10/2020 |
| JP | 2005234077 | A | 9/2005 |
| KR | 100598738 | B1 | 7/2006 |
| KR | 102057873 | B1 | 12/2019 |
| WO | 2008038358 | A1 | 4/2008 |

* cited by examiner

- prior art -

- prior art -

DRIVING CIRCUIT, DRIVING METHOD AND DISPLAY DEVICE

CROSS-REFERENCE TO RELATED APPLICATIONS

The present application is a Section 371 National Stage application of International Application No. PCT/CN2021/094427, which is filed on 18 May, 2021 and published as WO/2022/016970 on 27 Jan., 2022, and claims priority to Chinese Patent Application No. 202010705189.X, filed on Jul. 21, 2020, and entitled "DRIVE CIRCUIT, DRIVE METHOD AND DISPLAY DEVICE", the entire contents of which are incorporated herein by reference in their entirety.

FIELD OF THE DISCLOSURE

The present disclosure relates to a technical field of liquid crystal display, in particular to a driving circuit, a driving method and a display device.

DESCRIPTION OF THE RELATED ART

In a liquid crystal display (LCD) device in the prior art, a structure of a display panel generally includes a plurality of pixel structures, each pixel structure includes sub-pixel structures corresponding to three-primary colors (red, green and blue, i.e., RGB), respectively, and grayscale adjustment of each pixel structure as a whole is realized by perform color adjustment on the sub-pixel structures, thereby realizing color image display.

With the development of display technology, display resolution of display panels is becoming more and more important. However, depending on different applications of display panels, required resolutions may be different. According to different requirements from customers, who need a panel, for the resolution of a LCD device, chip design companies need to customize corresponding panel driver chips according to the different resolution requirements, thus increasing design time, production time and start-up cost.

SUMMARY

In view of the above problems, an objective of the present disclosure is to provide a driving circuit, a driving method and a display device, wherein decoders are added to a plurality of driver units, and according to a selection signal, a part of the plurality of driver units are controlled to receive a start pulse signal, so that under a condition with a certain physical resolution, a resolution during display can be changed without exceeding the physical resolution, thus reducing research and development cost and cumbersome processes for customization, and speeding up shipment of products.

According to a first aspect of the present disclosure, a driving circuit for driving a display panel is provided and includes: a timing controller, configured to provide a start pulse signal and a selection signal; a driving module, which comprises a plurality of driver units that are cascaded, and is configured to control a part of the plurality of driver units to receive the start pulse signal according to the selection signal and generate a grayscale voltage according to the start pulse signal and a data signal.

In some embodiments, the part of the plurality of driver units to receive the start pulse signal comprise adjacent driver units.

In some embodiments, the plurality of driver units each comprise: a decoder, connected with the timing controller for receiving the selection signal and the start pulse signal; a shift register, connected with the decoder and used for receiving and transmitting the start pulse signal; a latch, coupled to the shift register and a data bus, and configured to obtain the data signal from the data bus according to the start pulse signal; an operational amplifier, connected to the latch and the display panel, and configured to generate the grayscale voltage according to the data signal and apply the grayscale voltage to the display panel.

In some embodiments, the decoders in the plurality of driver units are sequentially connected, and one of the decoders in the plurality of driver units that is arranged at a starting position is configured to receive and transmit the selection signal.

In some embodiments, any one of the decoders in the plurality of driver units is configured to apply, according to the selection signal, the start pulse signal to a corresponding one of the shift registers in the plurality of driver units that is connected to that one of the decoders in the plurality of driver units.

In some embodiments, the shift registers in the plurality of driver units are sequentially connected, and the start pulse signal is unidirectionally transmitted among the shift registers in the plurality of driver units sequentially.

In some embodiments, the decoders in the plurality of driver units are configured to control the start pulse signal to be transferred among the shift registers in the plurality of driver units according to the selection signal.

According to a second aspect of the present disclosure, a driving method of a display device is provided. The display device includes a display panel, a driving module including a plurality of driver units that are cascaded, and a timing controller. The driving method includes: applying a selection signal and a start pulse signal to the driving module via the timing controller; controlling, according to the selection signal, a part of the plurality of driver units to receive the start pulse signal; and generating a grayscale voltage according to the start pulse signal and a data signal.

In some embodiments, the start pulse signal is unidirectionally transmitted among the plurality of driver units which are cascaded.

According to a third aspect of the present disclosure, a display device is provided and includes a driving circuit as described in embodiments of the present disclosure.

In the driving circuit provided according to the present disclosure, decoders are added to the plurality of driver units, and according to the selection signal, a part of the plurality of driver units are controlled to receive the start pulse signal, so that under a condition with a certain physical resolution, the resolution during display can be changed without exceeding the physical resolution, thus reducing research and development cost and the cumbersome processes for customization, and speeding up shipment of products.

BRIEF DESCRIPTION OF THE DRAWINGS

The above and other objects, features and advantages of the present disclosure will become more apparent from descriptions of embodiments of the present disclosure with reference to the following accompanying drawings, in which.

DETAILED DESCRIPTION OF EMBODIMENTS OF THE DISCLOSURE

Figure 1:
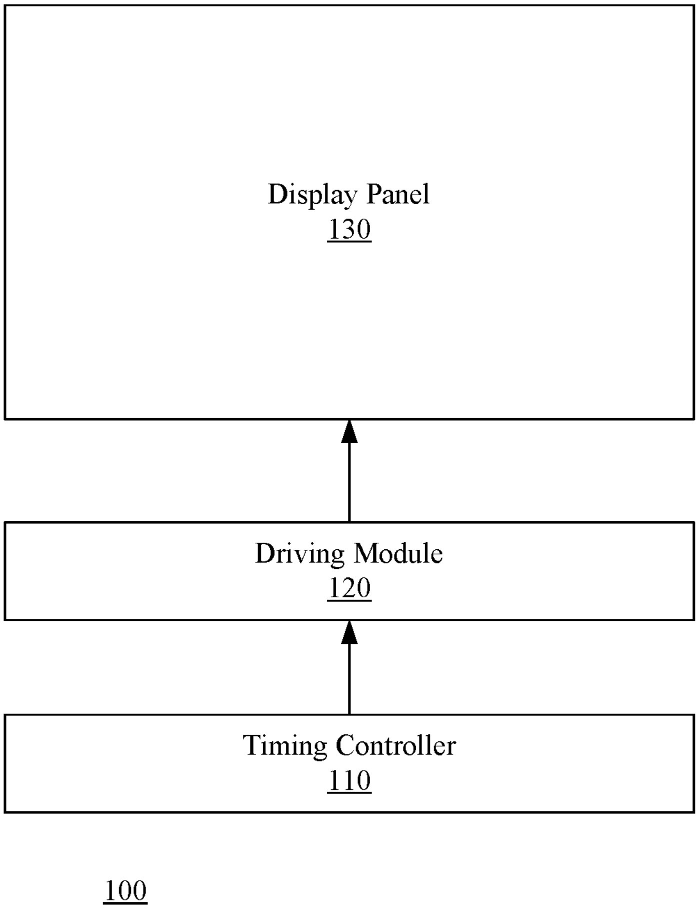
FIG. 1 shows a structural schematic diagram of a display device according to the prior art.

Various embodiments of the present disclosure will be described in more detail below with reference to the accompanying drawings. Throughout the various figures, like elements are denoted by the same or similar reference symbols. For the sake of clarity, various parts in the drawings are not drawn to scale.

With reference to the accompanying drawings and embodiments, specific implementations of the present disclosure are described in further detail below.

FIG. 1 shows a structural schematic diagram of a display device according to the prior art.

Referring to FIG. 1, a display device 100 includes a display panel 130, a driving module 120 and a timing controller 110. The display panel 130 includes an array of pixels arranged in rows and columns, the driving module 120 includes a gate driving circuit and/or a source driving circuit. In this embodiment, the driving module is, for example, the source driving circuit, and the timing controller 110 is, for example, configured to control the gate driving circuit and the source driving circuit.

In the display panel 130, a plurality of gate lines GL and a plurality of data lines DL are provided, and a plurality of sub-pixels are arranged in intersection areas between the plurality of gate lines GL and the plurality of data lines DL. For example, if the display panel has a resolution of 1080 RGB in a width direction, each pixel in the array has sub-pixels corresponding to three colors of red, green and blue (RGB), respectively, so that 3240 corresponding driving lines are required, that is, the driving circuit 120 needs 3240 driver units to drive the display panel, which has a resolution of 1080 RGB.

Figure 2:
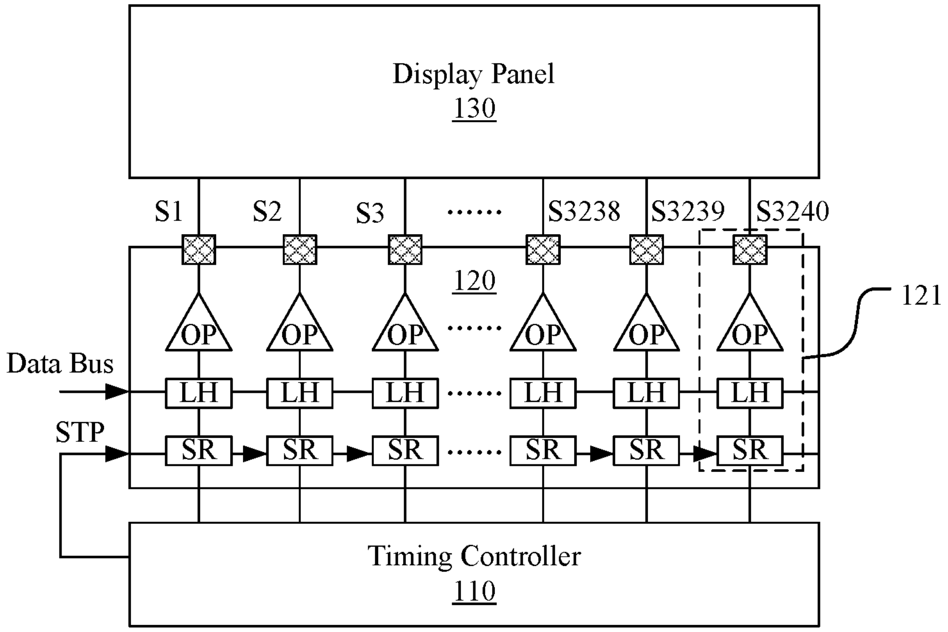
FIG. 2 shows a structural schematic diagram of a driving circuit in the display device according to the prior art.

FIG. 2 shows a structural schematic diagram of a driving circuit in the display device according to the prior art. Referring to FIG. 2, the driving module 120 includes a plurality of driver units 121 which are cascaded, each of the plurality of driver units includes a shift register SR, a latch LH, and an operational amplifier OP connected sequentially, wherein the shift registers SR of the plurality of driver units 121 are sequentially connected for receiving and transmitting a start pulse signal STP, and the latches LH of the plurality of driver units 121 are sequentially connected for being coupled to a data bus (Data Bus), so as to receive a data signal.

In this embodiment, the timing controller 110 is configured to generate the start pulse signal STP, the shift register SR of the first driver unit 121 (S1) of the plurality of driver units 121 receives the start pulse signal STP, and unidirectionally transfers the start pulse signal STP to the shift registers SR of other driver units 121 in sequence. The latch LH connected to the shift register SR receives the data signal from the data bus (Data Bus) under control of the start pulse signal STP, then, the data signal can be amplified through the operational amplifier OP connected to that latch LH and then can be sent to a corresponding pixel in the display panel, so as to drive the display panel.

However, the start pulse signal STP can only be sent to the shift register SR of the first driver unit 121 (S1) of the plurality of driver units 121, and then transmitted from the first driver unit 121 (S1) of the plurality of driver units 121 to other driver units 121 sequentially in a single direction, thus when the display device is required to provide another resolution, the driving module 120 needs to be re-customized and the number of the plurality of driver units 121 needs to be changed, in order to change the resolution of the display device.

Figure 3:
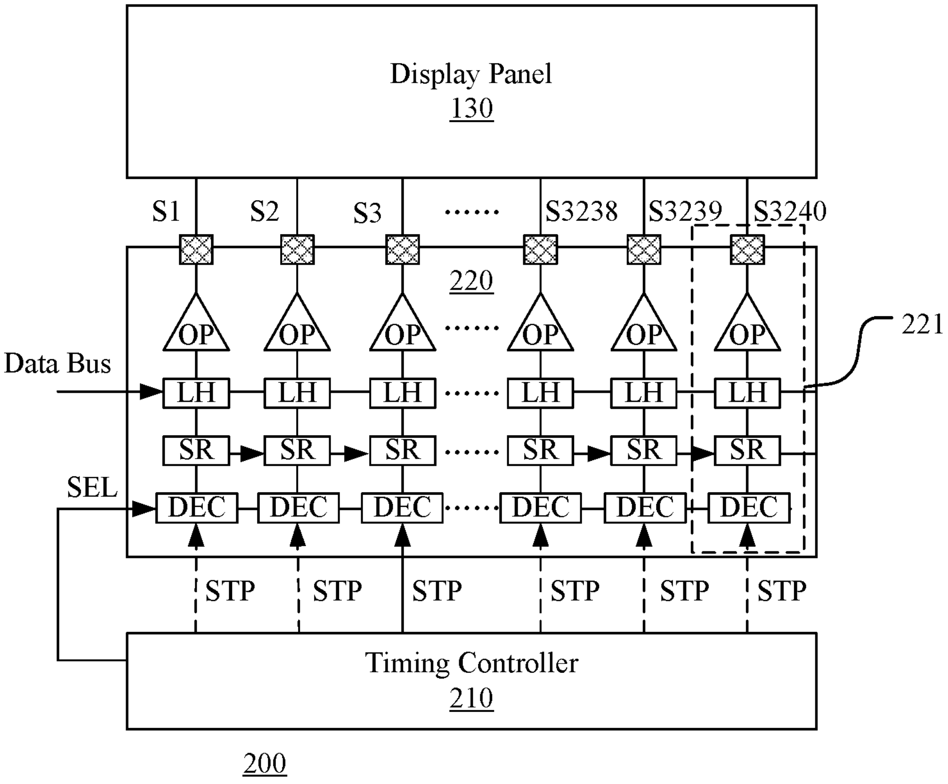
FIG. 3 shows a structural schematic diagram of a display device according to an embodiment of the present disclosure.

FIG. 3 shows a structural diagram of a display device according to an embodiment of the present disclosure. Referring to FIG. 3, a display device 200 according to an embodiment of the present disclosure includes a display panel 130, a driving module 220 connected to the display panel 130 and a timing controller 210 connected to the driving module 220. The driving module 220 includes a plurality of driver units 221 which are connected to a plurality of driving lines (e.g., gate lines or source lines) of the display panel 130 in one-to-one correspondence, and in this embodiment, the driving module 220 is, for example, a source driving circuit.

The timing controller 210 is used to generate a start pulse signal STP and a selection signal SEL. The start pulse signal STP is used to control the driving module 220 to acquire a data signal from the data bus (Data Bus). The selection signal SEL is used to control a part of the plurality of driver units 221 to receive the start pulse signal STP.

Each driver unit 221 in the driving module 220 includes a decoder DEC, a shift register SR, a latch LH and an operational amplifier OP which are sequentially connected. Each driver unit 221 is connected to the timing controller 210.

In this embodiment, the decoders DEC of the plurality of driver units 221 are sequentially connected for receiving the start pulse signal STP and the selection signal SEL, the shift registers SR of the plurality of driver units 221 are sequentially connected and each of the shift registers SR of the plurality of driver units 221 is configured to receive and unidirectionally transmit the start pulse signal STP output by the decoder DEC which is connected to that shift register SR, and the latches LH of the plurality of driver units 221 are sequentially connected for being coupled to the data bus (Data Bus), so as to receive the data signal.

In this embodiment, the decoders DEC of the plurality of driver units 221 are configured to select one of the plurality of driver units 221 to receive the start pulse signal STP in accordance with the selection signal SEL, at the same time, the decoders DEC of the plurality of driver units are also configured to control the start pulse signal STP to be transmitted among the plurality of driver units 221 in accordance with the selection signal SEL, thereby controlling a part of the plurality of driver units 221 to receive the start pulse signal STP. The part of the plurality of driver units 221 to receive the start pulse signal STP are adjacent driver units, the start pulse signal STP for the first one of the plurality of driver units 221 is provided from the timing controller 210, the start pulse signal STP for each of other driver units 221 is provided from a previous one of the plurality of driver units 221 that is cascaded with that driver unit, and the start pulse signal STP is unidirectionally transmitted among the plurality of driver units 221.

In this embodiment, the timing controller 210 is configured to generate the start pulse signal STP and the selection signal SEL, the decoders DEC of the plurality of driver units 221 are all connected to the timing controller 210 for receiving the start pulse signal STP, and the decoder DEC of the first driver unit 221 (S1) of the plurality of driver units 221 is further configured to receive the selection signal SEL.

In this embodiment, the driving module 220 is configured to control a part of the plurality of driver units 221 to receive the start pulse signal STP according to the selection signal, and generate a grayscale voltage according to the start pulse signal STP and the data signal, so as to drive the display panel 130. Specifically, under control of the selection signal SEL, the start pulse signal STP can be transmitted, by the decoder DEC of any one of the plurality of driver units 221, to the shift register SR connected to that decoder DEC, thereby, the start pulse signal STP can start to be unidirectionally transmitted among the shift registers SR in sequence, meanwhile, the latch LH connected to the shift register SR that has received the start pulse signal STP can obtain the data signal from the data bus (Data Bus) at a time when the start pulse signal STP is applied, then the data signal can be amplified by the operational amplifier OP to obtain a grayscale voltage for driving the display panel 130, and the grayscale voltage is then send to a corresponding pixel in the display panel 130 through a corresponding data line, so as to drive the display panel 130.

In this embodiment, due to the selection signal SEL and the decoders DEC, the start pulse signal STP can start to be transmitted from any one of the shift registers SR of the plurality of driver units 221. For example, if the display panel 130 has a resolution of 1080 RGB in a width direction, the driving module 220 is required to provide 3240 driver units 221 for normally driving the display panel 130; if the resolution required by customers does not exceed 1080 RGB, for example, when the resolution is required to be 828 RGB, 2484 driver units 221 are needed. Corresponding to the display panel 130, the 2484 driver units 221 can be, for example, the driver unit 221 (S379) to the driver unit 221 (S2862), or the driver unit 221 (S757) to the driver unit 221 (S3240); the driver unit 221 (S379) or the driver unit 221 (S757) can be selected to receive the start pulse signal STP by use of the selection signal SEL and the corresponding decoder DEC, so that the shift register SR corresponding to the driver unit 221 (S379) or the driver unit 221 (S757) can be the first shift register to receive the start pulse signal STP and transmit the start pulse signal STP unidirectionally to other shift registers, thereby the resolution can be changed.

In the driving method of the display panel according to embodiments of the present disclosure, the shift register SR of one of the plurality of driver units is selected to be the first shift register to receive the start pulse signal STP in accordance with the selection signal, so that the resolution of the display panel can be arbitrarily changed without exceeding an intrinsic physical resolution, thereby reducing research and development cost and the cumbersome processes for customization, and speeding up shipment of products.

The embodiments in accordance with the present disclosure, as described above, are not exhaustively described in all detail nor limited to the specific embodiments described. Obviously, many modifications and variations are possible in light of the foregoing description. These embodiments are selected and described in detail in the specification in order to better explain the principles and practical applications of the present disclosure, so that those skilled in the art can take full advantage of the present disclosure and modifications based on the present disclosure. The invention is limited only by the claims and their full scope and equivalents.

What is claimed is:

1. A driving circuit for driving a display panel, wherein the driving circuit comprises:

a timing controller, configured to providing a start pulse signal and a selection signal;

a driving module, which comprises a plurality of driver units that are cascaded, and is configured to control a part of the plurality of driver units to receive the start pulse signal according to the selection signal and generate a grayscale voltage according to the start pulse signal and a data signal, wherein each of the plurality of driver units comprises a decoder and a shift register, the decoder in each one of the plurality of driver units is connected between the timing controller and the shift register in that one of the plurality of driver units, so that a selected one of the decoders of the plurality of driver units is configured to transmit the start pulse signal directly from the timing controller to the shift register that is connected with the selected one of the decoders.

2. The driving circuit according to claim 1, wherein the part of the plurality of driver units to receive the start pulse signal comprise adjacent driver units.

3. The driving circuit according to claim 1, wherein the plurality of driver units each comprise:

the decoder, connected with the timing controller for receiving the selection signal and the start pulse signal;

the shift register, configured to receive and transmit the start pulse signal;

a latch, coupled to the shift register and a data bus, and configured to obtain the data signal from the data bus according to the start pulse signal;

an operational amplifier, connected to the latch and the display panel, and configured to generate the grayscale voltage according to the data signal and apply the grayscale voltage to the display panel.

4. The driving circuit according to claim 3, wherein the decoders in the plurality of driver units are sequentially connected, and one of the decoders in the plurality of driver units that is arranged at a starting position is configured to receive and transmit the selection signal.

5. The driving circuit according to claim 4, wherein any one of the decoders in the plurality of driver units is configured to apply, according to the selection signal, the start pulse signal to a corresponding one of the shift registers in the plurality of driver units that is connected to that one of the decoders in the plurality of driver units.

6. The driving circuit according to claim 5, wherein the shift registers in the plurality of driver units are sequentially connected, and the start pulse signal is unidirectionally transmitted among the shift registers in the plurality of driver units sequentially.

7. The driving circuit according to claim 6, wherein the decoders in the plurality of driver units are configured to control the start pulse signal to be transferred among the shift registers in the plurality of driver units according to the selection signal.

8. A display device comprising the drive circuit according to claim 1.

9. The driving circuit according to claim 1, wherein the decoders of the plurality of driver units are sequentially connected for receiving the selection signal, and the selected one of the decoders of the plurality of driver units is selected according to the selection signal.

10. The driving circuit according to claim 1, wherein the shifter registers of the plurality of driver units are sequentially connected, and among the shift registers of the part of the plurality of driver units, the start pulse signal is transmitted stage by stage from the shift register that is connected with the selected one of the decoders.

11. A driving method of a display device, which comprises a display panel, a driving module comprising a plurality of driver units that are cascaded, and a timing controller, wherein the driving method comprises:

applying a selection signal and a start pulse signal to the driving module via the timing controller;

controlling, according to the selection signal, a part of the plurality of driver units to receive the start pulse signal, and generating a grayscale voltage according to the start pulse signal and a data signal, wherein each of the plurality of driver units comprises a decoder and a shift register, the decoder in each one of the plurality of driver units is connected between the timing controller and the shift register in that one of the plurality of driver units, so that a selected one of the decoders of the plurality of driver units is configured to transmit the start pulse signal directly from the timing controller to the shift register that is connected with the selected one of the decoders.

12. The driving method according to claim 11, wherein the start pulse signal is unidirectionally transmitted among the plurality of driver units which are cascaded.

* * * * *